United States Patent
Chandrasekaran

(10) Patent No.: US 7,284,151 B2
(45) Date of Patent: Oct. 16, 2007

(54) CONDITIONAL DATA ACCESS AFTER DATABASE SYSTEM FAILURE

(75) Inventor: Sashikanth Chandrasekaran, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 803 days.

(21) Appl. No.: 10/624,242

(22) Filed: Jul. 21, 2003

(65) Prior Publication Data

US 2005/0022047 A1   Jan. 27, 2005

(51) Int. Cl.
G06F 11/00 (2006.01)

(52) U.S. Cl. .................................. 714/9; 714/13
(58) Field of Classification Search ............ None
See application file for complete search history.

(56) References Cited

U.S. PATENT DOCUMENTS

| | | | |
|---|---|---|---|
| 4,885,684 A | | 12/1989 | Austin et al. |
| 5,305,448 A | * | 4/1994 | Insalaco et al. ............ 711/164 |
| 5,550,973 A | * | 8/1996 | Forman et al. ............. 714/10 |
| 5,553,303 A | * | 9/1996 | Hayashi et al. ............ 707/2 |
| 5,615,254 A | | 3/1997 | Qiu et al. |
| 5,623,671 A | * | 4/1997 | Ando et al. ............... 710/200 |
| 5,920,872 A | * | 7/1999 | Grewell et al. ........... 707/202 |
| 5,966,706 A | | 10/1999 | Biliris et al. |
| 6,199,105 B1 | * | 3/2001 | Soejima et al. ............ 709/213 |
| 6,275,953 B1 | | 8/2001 | Vahalia et al. |
| 6,301,676 B1 | * | 10/2001 | Kumar et al. .............. 714/11 |
| 6,374,362 B1 | * | 4/2002 | Ohtsu ........................ 714/4 |
| 6,510,350 B1 | | 1/2003 | Steen, III et al. |
| 6,539,446 B1 | * | 3/2003 | Chan ......................... 710/200 |
| 6,574,749 B1 | * | 6/2003 | Parsons ...................... 714/15 |
| 6,697,901 B1 | * | 2/2004 | Shun Chan ................ 710/200 |

FOREIGN PATENT DOCUMENTS

EP   1310873 A1   5/2003

OTHER PUBLICATIONS

Cai, "Building Highly Available Database Servers Using Oracle Real Application Clusters," Oracle Corporation, May 2001, pp. 1-16.

Josten et al., "DB2's Use of the Coupling Facility for Data Sharing," IBM 1997, pp. 1-30.

Yu et al., "On Affinity Based Routing in Multi-System Data Sharing," Proc. of 12th Int. Conf. on Very Large Databases (Kyoto), Aug. 1986, pp. 249-256.

* cited by examiner

*Primary Examiner*—Gabriel Chu
(74) *Attorney, Agent, or Firm*—Hickman Palermo Truong & Becker LLP

(57) ABSTRACT

A method of operation within a data processing system that includes a plurality of processing nodes each having access to a set of shared resources. Failure of one of the processing nodes is detected, followed by receipt of a request to access a first resource of the set of shared resources. Access to the first resource is granted if the failed node was not responsible for controlling access to the first resource and did not have exclusive access to the first resource when the failure was detected.

25 Claims, 9 Drawing Sheets

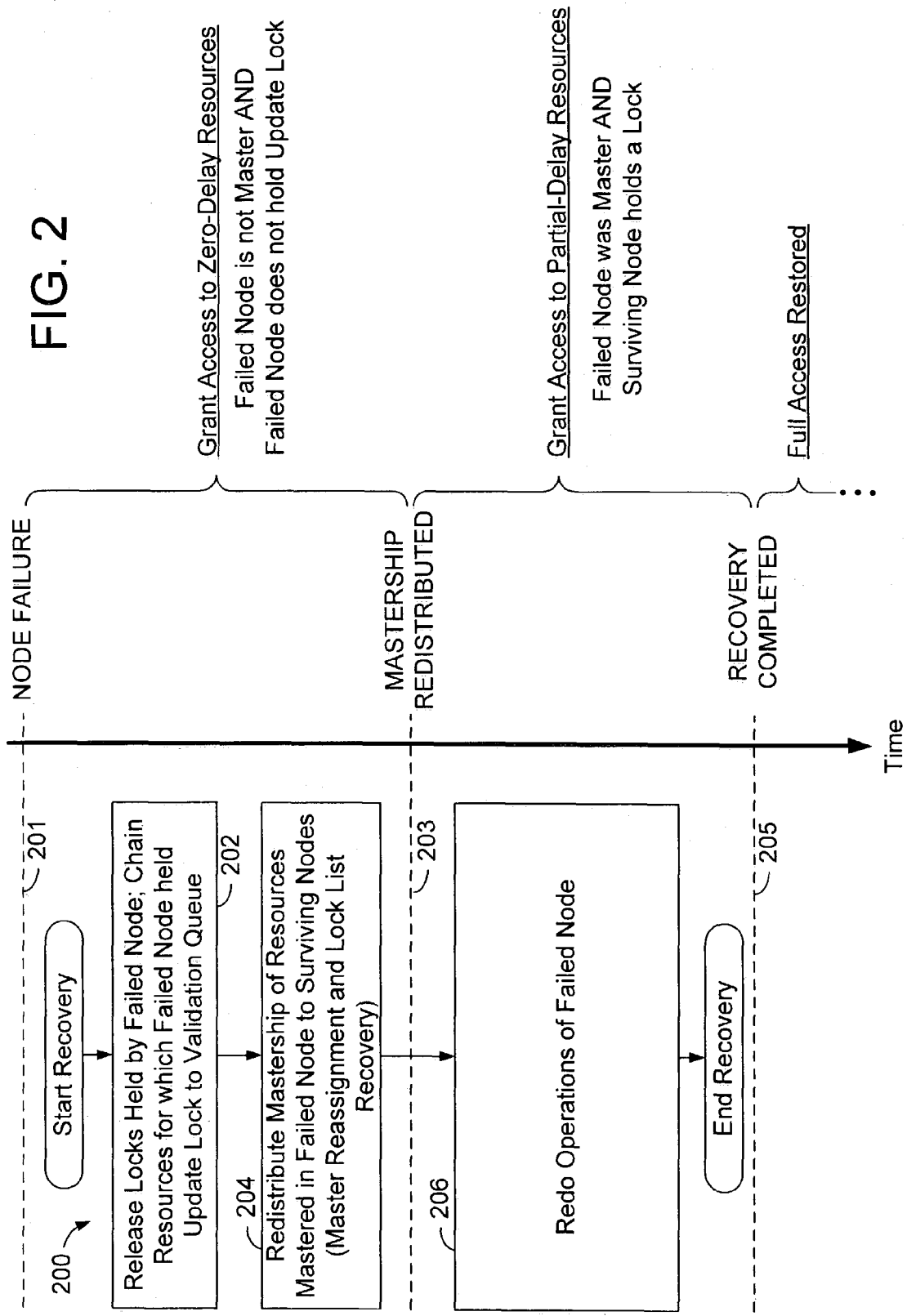

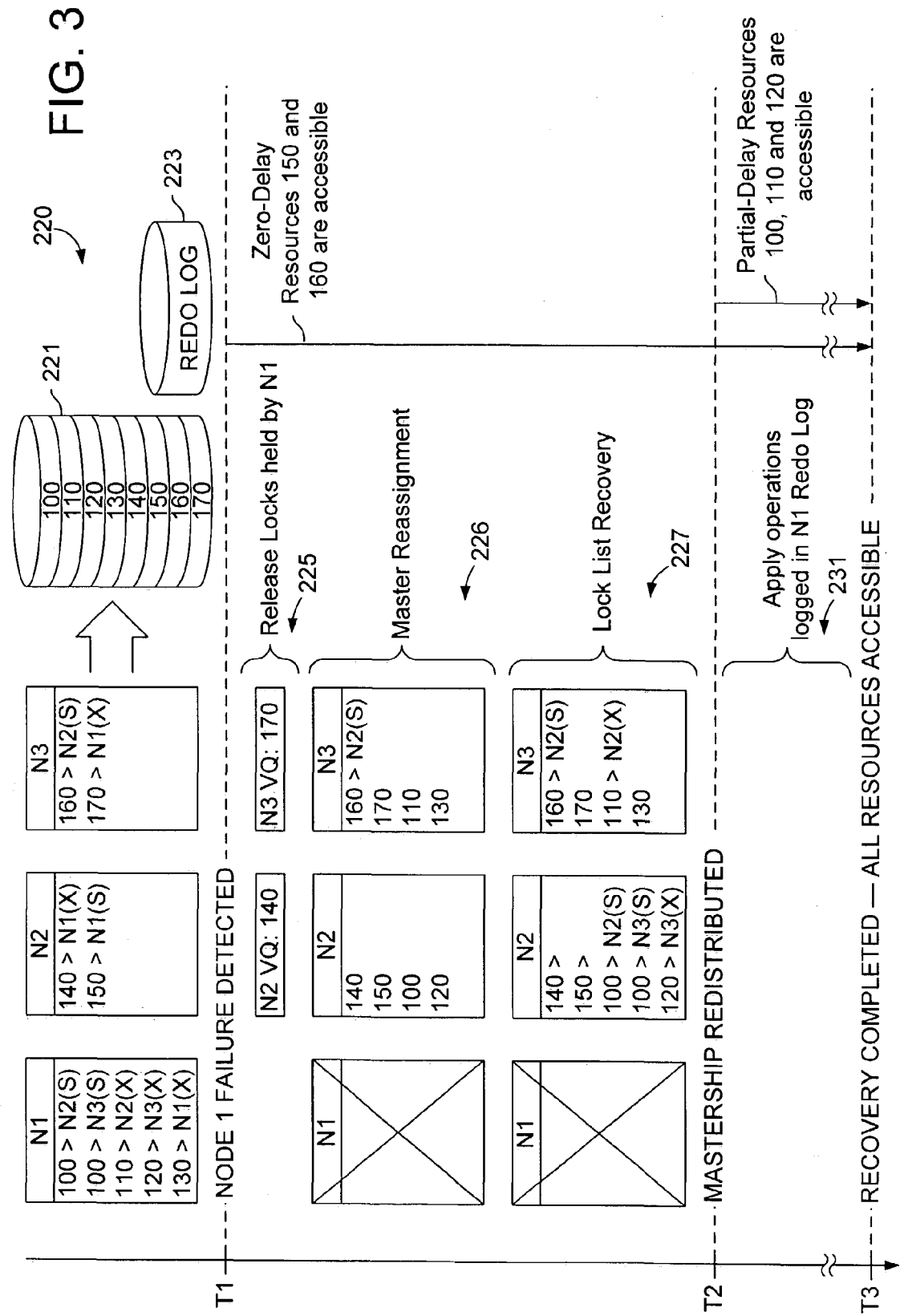

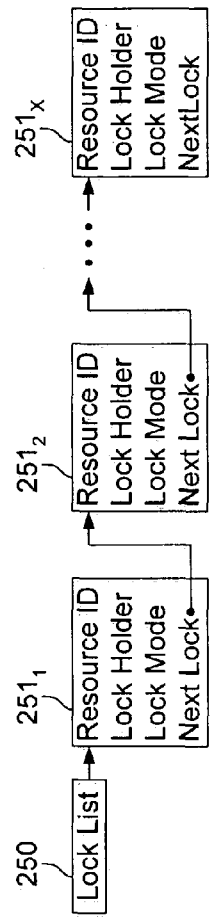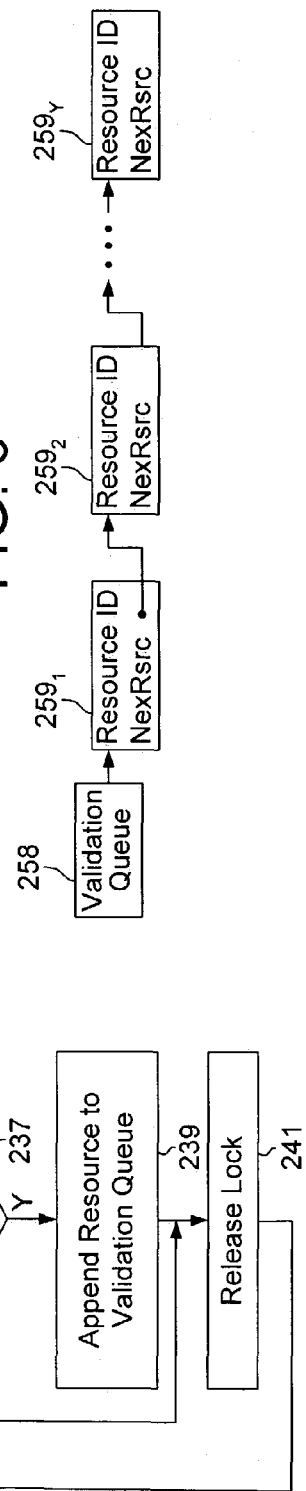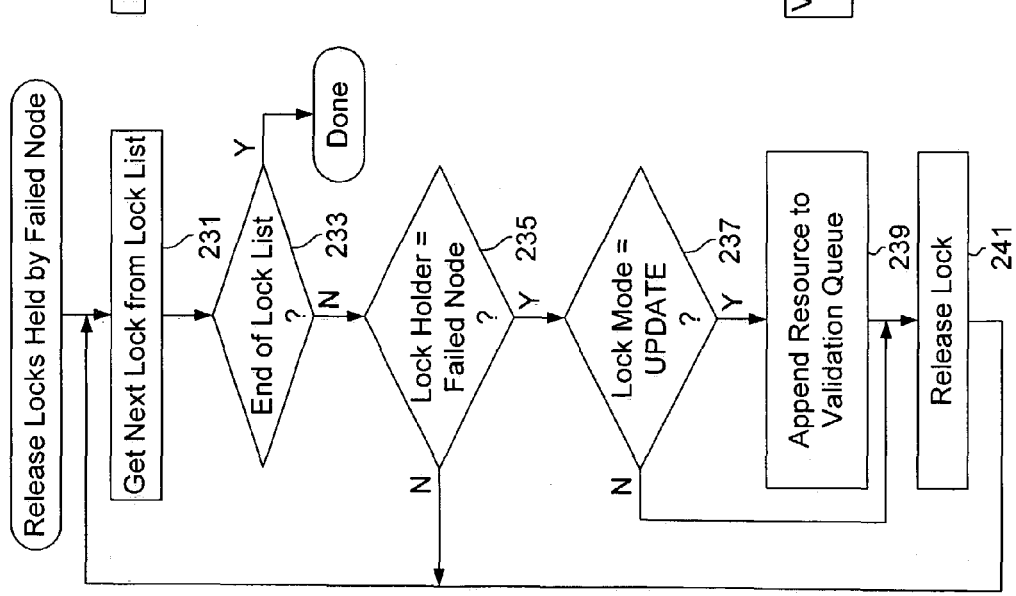

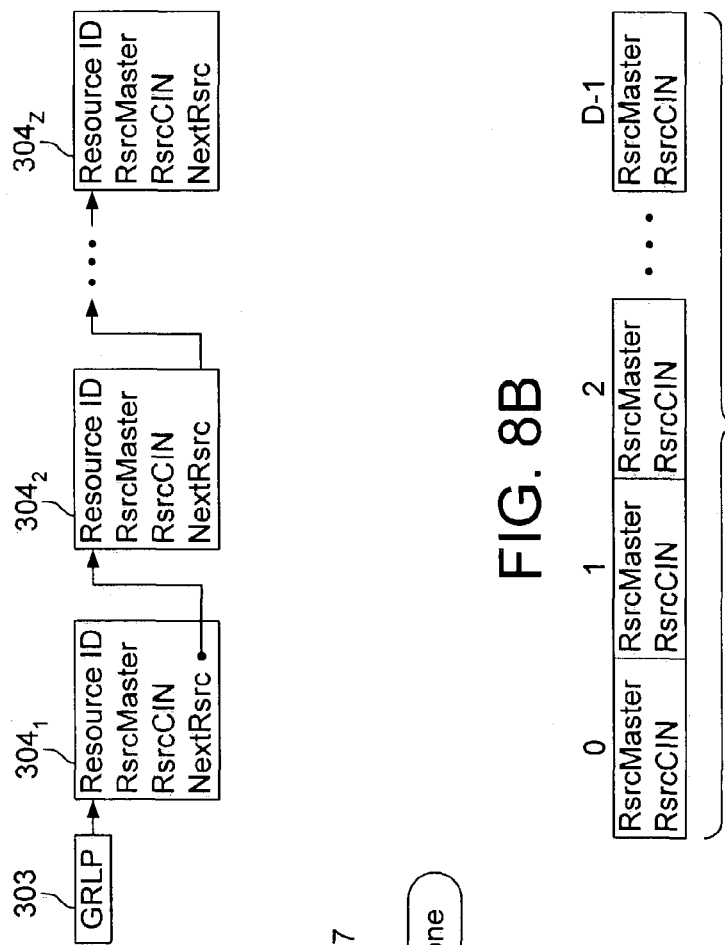
FIG. 7
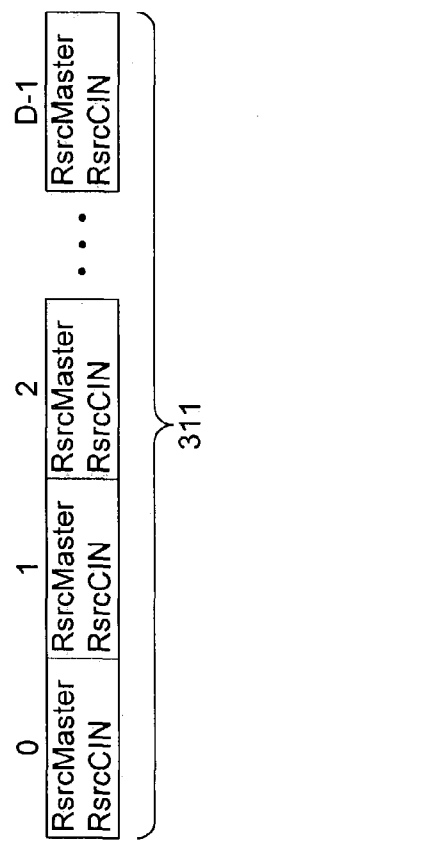
FIG. 8A
FIG. 8B

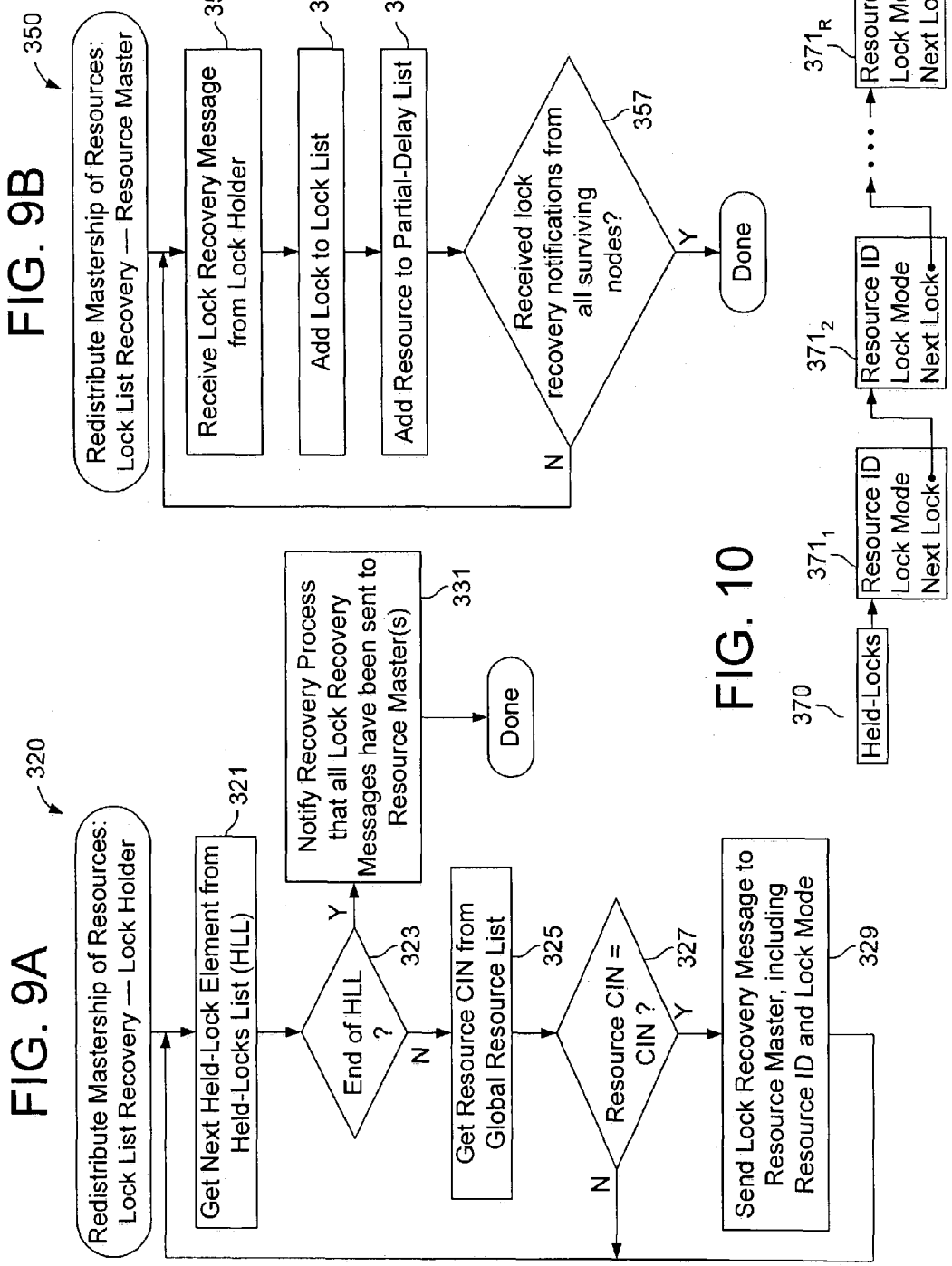

CONDITIONAL DATA ACCESS AFTER DATABASE SYSTEM FAILURE

FIELD OF THE INVENTION

The present invention relates generally to data processing, and more particularly to accessing shared data in a clustered database system.

BACKGROUND

Data locking protocols are commonly used to manage access to shared data in a multi-processing environment. In a typical locking protocol, processes seeking read or write access to a data resource acquire locks to the resource to prevent incompatible accesses. For example, a process seeking to update a data resource (e.g., through a write operation or other data-modifying operation), requests an exclusive lock to the resource from a master process for that resource. After the master process grants the exclusive lock to the requester process, the requester process obtains a local copy of the resource, for example from a disk drive or other persistent storage, then performs update operations on the local copy, rendering the corresponding content of the persistent storage stale. Other requests to access the data resource are denied by the master pending release of the exclusive lock by the prior requester process. By serializing access to the data resource in this way, loss of data coherency is avoided as the subsequent requester processes are prevented from accessing stale data.

Not all accesses to shared resources must be serialized. For example, multiple shared locks may typically be held simultaneously by processes seeking to read the same data resource, as no loss of coherency will occur due to the order in which the read accesses take place. By contrast, if a requester process requests an exclusive lock to a data resource while a shared lock is open (i.e., shared lock granted and not yet released), the master process may deny the exclusive lock request until the shared lock is released to ensure that no out-of-order access occurs.

One contingency that locking protocols must usually account for is failure of a processing node. Referring to FIG. 1, for example, each of N processing nodes 105 within prior-art database system 100 may concurrently execute any number of processes that seek access to data in a shared data storage 101. In one possible sequence of events, a process executing on Node 1 acquires an exclusive lock to a shared data resource 101 containing data D1 (indicated in FIG. 1 by arrow 111); updates D1 to produce D2 (112); records the update operation in a redo log 103 (113); then fails before D2 is written back to the data resource 101, the non-operation being indicated by dashed line 114. In this failure scenario, subsequent access to the shared data storage is restricted to ensure that no operations are performed on the now stale data, D1, with the level of restriction depending on the nature of the locking protocol.

In one prior-art locking protocol, a single process referred to herein as a centralized lock manager acts as the resource master for all shared resources in the database system. When a node fails, the centralized lock manager may continue to grant access to data resources that were not exclusively locked by the failed node. Thus, the centralized lock manager enables at least limited access to the shared data storage while the update operations performed by the failed node are recovered. On the downside, because all lock requests are directed to the centralized lock manager, the centralized lock manager tends to be a scalability bottleneck, degrading system performance as the number of processes and lock requests grows. Also, the centralized lock manager constitutes a single point of failure. If the node executing the centralized lock manager fails, all locking activity ceases, in effect rendering the shared data storage inaccessible and resulting in system-wide failure.

In another prior-art locking protocol, mastership of shared data resources is distributed among multiple lock manager processes each being executed by a respective one of the processing nodes 105. Thus, each processing node is a master for a subset of the shared resources. When a processing node fails, locking activity is temporarily halted and mastership of the resources mastered in the failed node is redistributed among the surviving nodes. Locking activity is resumed after the surviving nodes have completed applying the changes recorded in the redo log for the failed node. Although the single point failure and scalability limitations of the centralized lock manager approach are avoided, access to the shared data resources is denied until resource mastership is redistributed among the surviving nodes and the surviving nodes complete redoing the changes recorded in the redo log for the failed node.

Another prior-art locking protocol replicates mastership for each shared resource in two or more processing nodes, referred to as siblings. When the master for a particular resource fails, the sibling for the failed node will still have the locking information for the shared resource so that locking activity may continue during the recovery process. Unfortunately this replicated mastership approach substantially increases the amount of inter-process communication required for resource locking, decreasing system performance and limiting system scalability.

In yet another prior-art locking protocol coarse-grained locks are issued to enable exclusive or shared access to multiple data resources. Once a process acquires a coarse-grained lock, all data resources covered by that lock can be accessed even after a processing node failure, because the process owning the coarse-grained lock is assured that the failed node could not have modified any of the data resources. However, because many of the locked data resources may not actually be accessed by the lock holding process, coarse-grained locks tend to substantially increase false contention, leading to poor run-time performance.

BRIEF DESCRIPTION OF THE DRAWINGS

The features and advantages of the present invention are illustrated by way of example, and not by way of limitation, in the figures of the accompanying drawings and in which like reference numerals refer to similar elements and in which

FIG. 2 is a flow diagram for a conditional-access failure recovery operation according to an embodiment of the invention;

FIG. 3 illustrates the failure recovery operation of FIG. 2 applied in an exemplary database system;

FIG. 4 illustrates an embodiment of a lock release operation that is executed in each surviving node following a node failure detection;

FIG. 5 illustrates an exemplary embodiment of a lock list;

FIG. 6 illustrates an exemplary embodiment of a linked list data structure used to implement a validation queue;

FIG. 7 illustrates an embodiment of a master reassignment operation;

FIG. 8A illustrates an embodiment of a global resource list;

FIG. 8B illustrates a lookup table that may be used instead of the global resource list of FIG. 8A to identify a resource master and cluster incarnation number for a given resource;

FIGS. 9A and 9B illustrate counterpart operations performed by local recovery processes within surviving nodes to regenerate lock lists lost in a processing node failure;

FIG. 10 illustrates an embodiment of a held-locks list;

DETAILED DESCRIPTION

Figure 1:
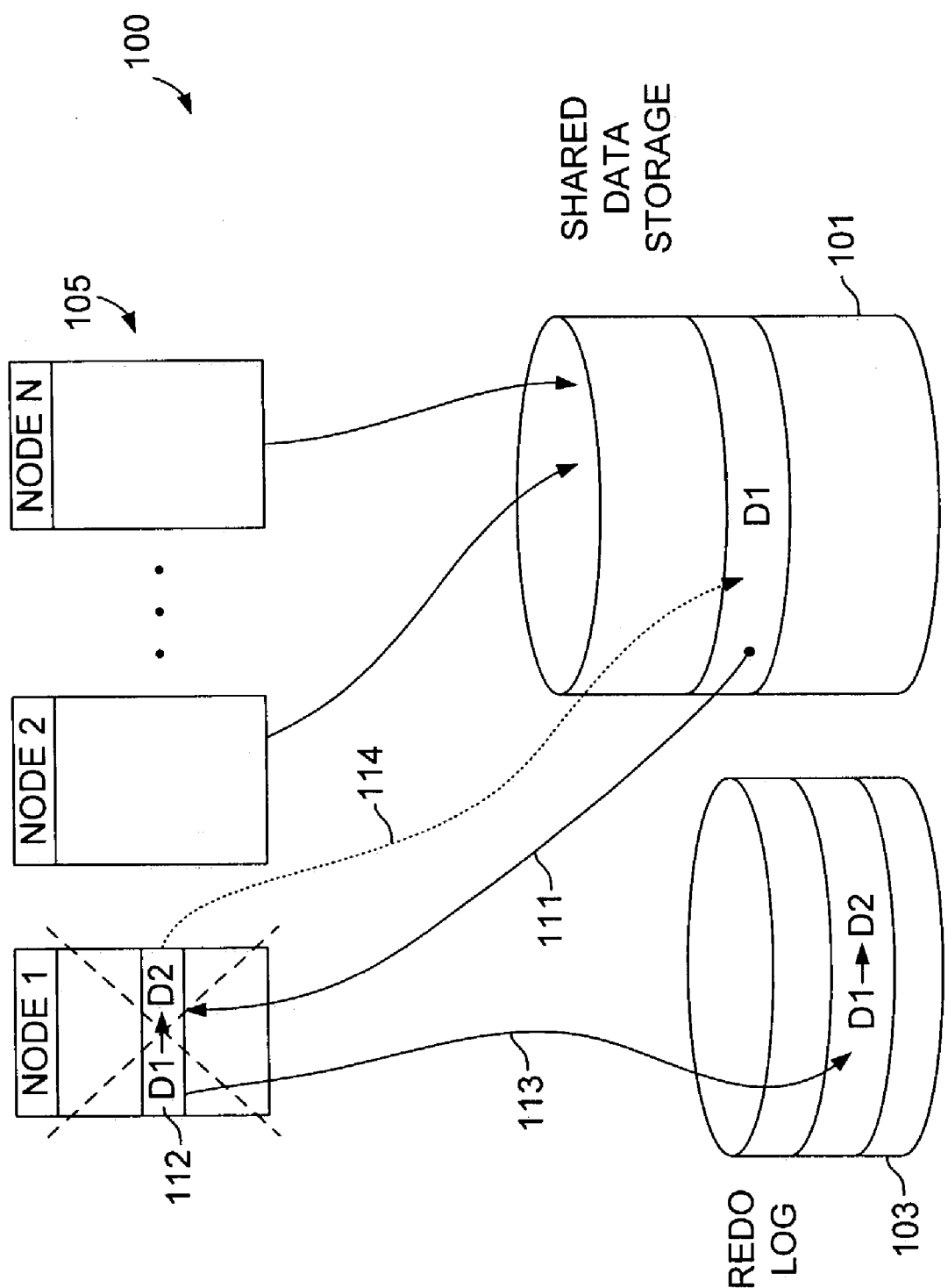
FIG. 1 illustrates access to a shared data storage in a prior-art database system.

In embodiments of the present invention, lock management responsibility is distributed among multiple processing nodes in a shared-storage database system. When a node failure is detected, shared data resources are rendered conditionally accessible prior to full recovery of the failed node changes and without replication of resource mastership in multiple nodes, thereby reducing average access delay after node failure without increasing susceptibility to single point of failure and without limiting system scalability.

Overview of Conditional-Access Failure Recovery

FIG. 2 is a flow diagram for a conditional-access failure recovery operation 200 according to an embodiment of the invention. During normal operation, multiple processes in a plurality of processing nodes each have access to a set of shared resources. The processes acquire update locks and shared locks (according to the requested access) from lock manager processes that are distributed among the processing nodes, each lock manager process being a master process (i.e., responsible for managing the grant and release of locks) for a respective subset of the shared resources. In the embodiments described below, the set of shared resources are data items within a relational database (e.g., a record or group of records within a database table, or even a database table itself), hierarchical database or other type of database. The data items may be stored in any type of data storage device including, without limitation, magnetic media devices (e.g., tape and disk drives), optical media devices (e.g., compact disk (CD) drives, digital versatile disk (DVD) drives, and holographic storage devices), semiconductor storage media (e.g., battery backed random access memory (RAM), electrically erasable programmable read only memory (EEPROM), flash EEPROM, etc.) or any combination of such storage devices. In alternative embodiments, the shared resources may be hardware resources within a computing environment (e.g., processors, memories, communication interfaces, communication links, controllers, peripheral devices, etc.) or any combination of data resources and hardware resources. Also, while the executed entity referred to herein is a process (i.e., execution of one or more sequences of instructions by a processing entity such as a processor or set of co-located or distributed processors), the techniques and embodiments may also be implemented using other executed entities such as threads (i.e., executed entity that shares a local variable space with another thread within the same process). Also, the expression "processing node" is used herein to mean any entity capable of executing one or more processes. In general, a processing node corresponds to a general-purpose computing device capable of receiving user input and having one or more processors that cooperate to execute sequences of instructions. A processing node may alternatively be a collection of such computing devices, a sub-entity within such a computing device (e.g., a processor that can be allocated to execution of a given set of processes and/or threads), a special-purpose processing device (e.g., containing digital signal processors, application specific processors, or other type of instruction executing device) or any combination of general-purpose and special-purpose computing devices. Processing nodes are occasionally described herein as taking a particular action with regard to a shared resource, such as requesting a lock, updating the resource, being a master of a resource, and so forth. It is to be understood that the processing node carries out such actions through execution of one or more processes including, without limitation, requester processes, master processes and recovery processes. A processing node hosts a process through execution of program code that defines the process and by providing incidental access to processing node resources (e.g., main memory, cache, processing bandwidth, buses, chipsets, communication interfaces, and so forth) specified by the program code.

The failure recovery operation 200 is initiated when a processing node failure is detected, as indicated by dashed line 201. Failure of a processing node may be detected in a number of ways including, without limitation, loss of heartbeat (i.e., periodic transmission or other detectable action by the failed node ceases to occur), non-response to communication or affirmative failure notification from the failed node. Initially, as shown at 202, each of the non-failed processing nodes, referred to herein as surviving nodes, identify and release locks held by the failed node, appending the resources locked exclusively by the failed node to a data structure referred to herein as a validation queue. The validation queue is discussed below in further detail.

After the locks held by the failed node have been released, mastership of the resources formerly mastered in the failed node is redistributed to the surviving nodes as shown at 204. Mastership redistribution involves two operations: reassignment of resource mastership to surviving nodes and lock list recovery. Both of these operations are described in detail below. Together the operations at 202 and 204 constitute a lock recovery phase of the overall failure recovery operation 200, as the records of locks granted to the failed node are cleared from the surviving nodes, and the lock mastership and lock grant status formerly maintained in the failed node are re-established in the surviving nodes. After the lock recovery phase is completed, one or more processes are executed in the surviving nodes to redo the transactions recorded in the redo log for the failed node, as indicated at 206. The redo operations collectively constitute a resource recovery phase of the failure recovery operation 200, as the redone transactions place the shared resources in the state they would have had in absence of the node failure. When all the transactions recorded in the redo log for the failed node have been redone, the recovery operation 200 is completed.

In contrast to the prior-art distributed lock management system described above, locking activity is not halted upon detecting the node failure, but rather is continued on a conditional basis throughout the lock recovery and resource recovery phases of the recovery operation. More specifically, during the lock recovery phase (i.e., between times 201 and 203), the surviving nodes may grant access to resources for which the failed node was not the resource master and for which the failed node did not hold an exclusive lock at the time the failure was detected. Such resources are referred to herein as zero-delay resources, as access to such resources may be granted without delay (or with negligible delay) following detection of the node failure. In the event of multiple requests to access the same zero-delay resource, lock grants may need to be serialized (e.g., through granting of exclusive locks) to avoid incompatible accesses, but the node failure itself does not mandate delay in granting access to the resources.

After mastership has been redistributed (i.e., during the resource recovery phase), the surviving nodes may continue to grant access to the zero-delay resources and may additionally grant access to a second category of resources referred to herein as partial-delay resources. Partial-delay resources are resources for which the failed node was the resource master and for which a surviving node (or a process executed thereon) held a lock at the time the node failure was detected. The existence of the orphaned lock (i.e., lock granted by a failed master) enables a logical conclusion that the failed node could not have held an exclusive lock to the resource. Accordingly, as soon as the resource is re-mastered (i.e., assigned a new lock master) and the list of lock holders for the resource regenerated, requests to access the resource may be granted. More specifically, if the orphaned lock (or locks) is a shared lock, then additional shared locks may be granted to requester processes immediately after re-mastering. If the orphaned lock is an exclusive lock, or the post-failure requester process seeks exclusive access, locking protocol may be used to serialize accesses to the resource. In either case, access to the partial-delay resources may be granted prior to completion of the resource recovery phase.

Note that partial-delay resources are referred to as such because the mastership redistribution imposes at least some access delay on resources that were mastered in the failed node. In one embodiment, referred to herein as a synchronized redistribution embodiment, no partial-delay resources are accessible until redistribution of mastership is completed for all re-mastered resources. In an alternative embodiment, referred to herein as an incremental redistribution embodiment, redistribution of mastership may be determined to be complete for some re-mastered resources before others. In the incremental redistribution embodiment, access to the re-mastered resources for which redistribution of mastership is determined to be complete may be granted prior to completion of mastership redistribution for other re-mastered resources. In either embodiment, after the resource recovery phase is completed (indicated at 205), full access to all shared resources is restored, though still subject to serialization by the resource locking protocol.

FIG. 3 illustrates the failure recovery operation of FIG. 2 applied in an exemplary database system 220. In an initial incarnation, the database system includes three processing nodes, N1, N2 and N3, a shared storage 221 and a redo storage 223. The resources mastered in the processing nodes are listed under the node captions, and open locks to the resources (i.e., locks granted and not yet released) are designated by the notation ">Node Identifier (Lock Mode)." For example, prior to time T1, node N1 is the master for resources 100, 110, 120 and 130; nodes N2 and N3 each hold a shared lock (S) to resource 100; node N2 holds an exclusive lock (X) to resource 110; node N3 holds an exclusive lock to resource 120; and node N1 holds an exclusive lock to resource 130. Also, prior to time T1, node N2 is the master for resources 140 and 150 which are locked in exclusive mode and shared mode, respectively, by node N1. Lastly, prior to time T1, node N3 is the master for resources 160 and 170, with resource 160 being locked in shared mode by node N2 and resource 170 being locked in exclusive mode by node N1. The nodes, resources, resource mastership and resource lock status are presented in FIG. 2 for purposes of example only. More or fewer nodes and resources may be provided in alternative embodiments, and virtually any configuration of resource mastership and resource lock status may exist. Also, though shared locks and exclusive locks are described herein, various additional lock types may be used in alternative embodiments including, without limitation, numerous varieties of shared locks and exclusive locks.

Assuming that node N1 fails at time T1, the lock release operation described in reference to block 202 of FIG. 2 is executed as indicated by reference numeral 225. That is, each of the surviving nodes, N2 and N3, inspects the lock status for resources mastered in that node and releases locks held by the failed node N1. Resources locked exclusively by the failed node are appended to a validation queue within the surviving node. Thus, node N2 releases the locks to resources 140 and 150 and, because resource 140 is locked exclusively by node N1, appends resource 140 to a validation queue maintained by node N2 (designated "N2 VQ" in FIG. 3). Similarly, node N3 releases the exclusive lock to resource 170 and appends resource 170 to a validation queue maintained by node N3 (N3 VQ).

After the surviving nodes N2 and N3 release the locks held by N1, the mastership redistribution operation described in reference to block 202 of FIG. 2 is executed to reassign mastership of the resources mastered in the failed node and recover the lock lists for the re-mastered resources. In the master reassignment operation, indicated by reference numeral 226, mastership of the resources 100, 110 and 120 formerly mastered in the failed node N1 is reassigned to the surviving nodes N2 and N3 (the failed status of node N1 being indicated by the 'X' through the node). In the specific example shown, node N2 is assigned to be the new master of resources 100 and 120, and node N3 is assigned to be the new master of resources 110 and 130. Note that no locks are open for resources 140, 150 and 170 at the time of master reassignment 226 as the locks were released in the preceding lock release operation 225.

In the lock list recovery operation, indicated by reference numeral 227, the lock status for each re-mastered resource is recovered based on the locks held by the surviving nodes. In one embodiment, a lock list recovery process is executed within each surviving node to identify locks held to re-mastered resources and to notify the new master of the lock. In the exemplary lock list recovery of FIG. 3, a lock list recovery process executed in node N2 identifies a shared lock for re-mastered resource 100, and an exclusive lock for re-mastered resource 110. The node N2 lock list recovery process notifies a resource master process within node N2 of the shared lock for resource 100, and notifies a resource master process within node N3 of the exclusive lock for resource 110. Similarly, a lock list recovery process executed in node N3 identifies a shared lock for resource 100 and an exclusive lock for resource 120, and notifies the resource master process in node N2 (the new master) of the locks. Thus, after the lock list recovery operation is completed within all the surviving nodes, the lock lists maintained in node N2 will include the shared locks (S) to re-mastered resource 100 held by nodes N2 and N3, and the exclusive lock (E) to re-mastered resource 120 held by node N3. Similarly, the lock lists maintained within node N3 will include the shared lock to resource 160 (unchanged since the node failure) and the exclusive lock to re-mastered resource 110 held by node N2.

Reflecting on the lock list recovery 227, it should be noted that, because node N1 has failed, node N1 will likely be unable to notify the new master for resource 130 (i.e., node N3) of the exclusive lock held by node N1. This fact illustrates a basic distinction between re-mastered resources for which at least one surviving node (or a process executing thereon) held a lock at the time of the node failure and re-mastered resources for which no surviving node held a lock. If a surviving node held a lock, then the failed node could not have held an exclusive lock to the re-mastered resource. By contrast, if no surviving node held a lock to the re-mastered resource, then, absent information from the failed node, the surviving nodes cannot determine whether the failed node held an exclusive lock to the resource. Thus, even though resource 130 is shown to be unlocked after the lock list recovery at 227, resource 130 is not a partial-delay resource and remains unavailable until the transactions recorded in the redo log for the failed node are redone.

Still referring to FIG. 3, it can be seen that resources 150 and 160 were not mastered in or exclusively locked by the failed node N1 and therefore constitute zero-delay resources that are accessible immediately after the node failure and throughout the lock recovery and resource recovery phases of the failure recovery operation. Resources 100, 110 and 120 were mastered in the failed node, but locked by at least one surviving node (or by a process executing on a surviving node), and therefore constitute partial-delay resources that are available after mastership redistribution (i.e., after time T2). By contrast, resources 130, 140 and 170 do not constitute zero-delay resources (resource 130 was not mastered in a surviving node at the time the node failure was detected, and resources 140 and 170 were exclusively locked by the failed node), and do not constitute partial-delay resources (no surviving process held a lock to the re-mastered resource 130). Consequently, resources 130, 140 and 170 become accessible after the recovery operation is complete at time T3.

Releasing Locks Held by the Failed Processing Node

FIG. 4 illustrates an embodiment of a lock release operation 230 that is executed in each surviving node following a node failure detection. As discussed above in reference to FIGS. 2 and 3, the lock release operation is executed to release locks held by the failed node, and to append resources locked exclusively by the failed node to a validation queue. In one embodiment, a master process within each processing node maintains a lock list containing lock data values that correspond to resource locks granted by the master process, but not released (i.e., open locks). Referring to the lock list illustrated in FIG. 5, for example, each lock data value $251_1$-$251_X$ includes a number of component values including, without limitation, a resource identifier (Resource ID) to identify the resource to which the lock corresponds, a lock holder value (Lock Holder) that identifies the processing node (and/or process) to which the lock has been granted, and a lock mode value (Lock Mode) that indicates whether the lock is an exclusive lock or shared lock (additional lock types may be specified by the lock mode in alternative embodiments). In the particular embodiment of FIG. 5, the lock list is implemented as a linked list so that each lock data value 251 additionally includes a pointer value (Next Lock) that points to the next lock data value 251 in the list. Also, a head-of-list pointer 250 (Lock List) is provided to enable access to the first lock data value $251_1$ in the list. In alternative embodiments, the lock list may be implemented by an array of scalar values, an array of data structures (including data objects having self-contained methods), or any other data construct capable of indicating the lock grant status.

Returning to FIG. 4, a lock data value is selected from the lock list at block 231. Assuming an initial execution of the block 231 operation and assuming that the lock list corresponds to the embodiment of FIG. 5, a pointer to the first lock data value $251_1$ is obtained (i.e., the head-of-list pointer 250). The pointer is inspected at decision block 233 to determine whether the end of the lock list has been reached. In the exemplary lock list of FIG. 5, the end of the lock list is determined when a null pointer is detected. Thus, if there are no open locks to resources mastered in a given node, the head-of-list pointer 250 will itself be a null pointer. Otherwise, the Next Lock pointer for the last lock data value in the list may be assigned a null value to enable end-of-list detection. In an alternative embodiment, a Boolean value may be provided in each lock data value 251 and assigned a true or false value according to whether the lock data value is the last in list. Also, in non-linked-list embodiments, a counter value may be used to track the number of open locks granted by the master process, or a predetermined number of lock data values may be evaluated in the lock release operation (e.g., as in the case of a fixed-dimension array of lock data values).

If the end of the lock list is detected in decision block 233, the lock release operation 230 is completed. Otherwise, the lock holder component of the selected lock data value is compared with an identifier of the failed node in decision block 235 to determine whether the lock was granted to the failed node. If the lock was not granted to the failed node, no action is taken for the indicated lock, and the next lock data value is selected in block 231. If the lock was granted to the failed node, then the lock mode component of the selected lock data value is evaluated in decision block 237 to determine whether an exclusive lock was granted to the failed node. If so, then the resource indicated by the resource ID component of the selected lock data value is appended to a validation queue at block 239 and the lock data value is released from the lock list at 241. If a non-exclusive lock (e.g., a shared lock) was granted to the failed node, then the validation queue operation at 239 is skipped and the lock data value released at 241. In the linked list embodiment of FIG. 5, a lock data value is released by unlinking the lock data value from the linked list (e.g., by assigning the Next Lock component of the lock data value being released to the Next Lock component of the preceding lock data value) and freeing the storage allocated for the lock data value. In an alternative embodiment, a lock data value may be released by clearing a lock-valid indicator provided within the lock data value or by setting the resource ID, lock mode, and/or lock holder component of the lock data value (or other component of the lock data value) to a null value or other predetermined value.

In one embodiment, the master process within a given node maintains the lock list and traverses the list in response to resource access requests to determine whether any incompatible locks are open for the resource. Thus, the release of a lock data value at 241 effectively releases a lock to a shared resource and, in the absence of other locks to the resource, enables subsequent requestor processes to access the resource. Because resources locked exclusively by the failed node are not zero-delay resources or partial-delay resources (i.e., the resources may be stale) such resources are appended to the validation queue at 239 to signal their status as inaccessible during the failure recovery operation.

FIG. 6 illustrates an exemplary embodiment of a linked list data structure used to implement a validation queue. The validation queue includes a head-of-list pointer 258 (Validation Queue), and a linked list of data elements $259_1$-$259_Y$ that each include a resource ID component (Resource ID) and a next-resource pointer that points to the next resource in the list (NextRsrc). Each resource added to the validation queue (i.e., in block 239 of FIG. 4) is appended to the tail of the list by allocating storage space for a new data element 259, assigning the resource ID of the resource to be the resource ID component of the data element 259, and assigning the next-resource pointer for the former tail-of-list data element $259_Y$ to point to the newly generated list data element 259. The next-resource pointer for the newly appended data element 259 may be assigned a null value to indicate that the appended data element 259 constitutes the tail of the validation queue. Alternatively, a tail pointer, counter or other value may be updated to indicate that the newly appended data element 259 constitutes the validation queue tail. Note that the data elements $259_1$-$259_Y$ within the validation queue may include additional component values in alternative embodiments, and numerous different data structures may be used to form the validation queue. Also, the validation queue may be omitted altogether and the lock list of FIG. 5 (or other lock list implementation) may be used to perform the validating function of the validation queue. For example, rather than releasing the lock data value from the lock list, the lock holder component of the lock data value may be assigned the ID of the local recovery process (i.e., the recovery process executing on the processing node that hosts the master process), and the lock mode changed to exclusive mode. By this operation, other requests to access to the resource are denied by the resource master until the overall failure recovery operation is completed and the local recovery process releases its exclusive lock.

Redistribution of Resource Mastership

FIG. 7 illustrates an embodiment of a master reassignment operation 280 that is executed by a recovery process (or other process) in each surviving node following completion of a lock release operation (e.g., as described in reference to FIG. 4). As discussed above in reference to FIG. 2, the master reassignment operation is a component of mastership redistribution and is executed to reassign mastership of resources formerly mastered in the failed node.

Starting at block 285, the recovery process updates a cluster incarnation number (CIN), generates a list of processing nodes that constitute the present cluster incarnation and initializes an index variable, i, to zero. Herein, the expression "cluster incarnation" refers to the processing node configuration within the database system (i.e., cluster of processing nodes), and each new configuration has a corresponding cluster incarnation number. In one implementation, the cluster incarnation number is assigned a predetermined value for an initial cluster incarnation, and then incremented for each new cluster incarnation thereafter. In the case of a node failure, for example, a new cluster incarnation results from the loss of the failed node, and a new cluster incarnation number is generated to represent the surviving set of processing nodes. Thus, in the exemplary database system described in reference to FIG. 3, the cluster incarnation number may be set to one for the initial cluster incarnation consisting of nodes N1, N2 and N3, and then incremented to two when the failure of node N1 yields a new cluster incarnation consisting of nodes N2 and N3.

In one embodiment, each processing node in the database system maintains a global resource list (GRL) that identifies the resource master for each shared resource and the cluster incarnation (i.e., processing node configuration) in which the resource master was assigned. During normal operation, the global resource list is used to look up the resource master for a given resource so that access requests can be issued to the appropriate processing node. During failure recovery, the resource master information is used to identify resources mastered in the failed node and the cluster incarnation information is used to identify resources that have been re-mastered in the present cluster incarnation.

In one embodiment, illustrated in FIG. 8A, the global resource list is a linked list that includes a global resource list pointer 303 (GRLP) and a number of resource data elements $304_1$-$304_Z$. Each resource data element 304 includes a number of component values including, without limitation, a resource ID component (Resource ID) that identifies a shared resource, a resource master component (RsrcMaster) that identifies the resource master (i.e., a processing node and/or process within a processing node), and a resource cluster incarnation number (RsrcCIN) that identifies the cluster incarnation in which the resource master was assigned. Each resource data element additionally includes a pointer component (NextRsrc) that points to the next resource data element in the linked list. The end of the list may be marked by a tail pointer, counter that indicates the number of data elements, null-valued pointer component, or other end-of-list marker. To determine the master or cluster incarnation for a given resource, the linked list is traversed until a resource data element having the desired resource ID is found, and the desired information is retrieved.

In an alternative embodiment, the global resource list is composed of multiple sub-lists, with each sub-list being maintained for a respective group of shared resources. By this arrangement, the length of any linked list that must be traversed to find a resource data element for a given resource is reduced. A hash function, lookup or other technique may be used to deterministically group resources within one or more of the sub-lists. Thus, a process seeking information about a given resource may apply the hash function (or other group identifying technique) to the resource ID to identify the applicable sub-list for that resource, then traverse the sub-list to obtain the resource data element that corresponds to the resource ID. In one embodiment, recovery processes which access the GRL operate on groups of resources at a time, thereby completing component recovery operations one group at a time (e.g., lock release, master reassignment, lock list recovery, resource recovery). In such an embodiment, partial-delay resources that fall into a first-processed group may become accessible prior to subsequently processed resource groups. Thus, requests to access some partial-delay resources may be granted prior to completion of mastership redistribution for all resource groups. Hereinafter, reference to traversing the global resource list to identify a resource data element for a given resource should be understood to include an embodiment in which an initial operation of identifying a sub-list of resources prior to list traversal. It should be noted that the lock list described above in reference to FIG. 5 may also be implemented as multiple sub-lists rather than a single linked list.

Returning to FIG. 7, a resource data element is selected from the global resource list at block 287. Assuming an initial execution of block 287 and assuming that the global resource list is implemented according to the embodiment of FIG. 8A, the selection operation 287 returns a pointer to the first resource data element $304_1$. The pointer is evaluated at decision block 289 to determine whether the end of the global resource list has been reached. If so, then the master reassignment operation 280 is completed. If the end of the global resource list has not been reached, then the resource master component of the selected resource data element is compared with the node identifier of the failed node in decision block 291. If the resource master component does not match the identifier of the failed node, then the resource was not mastered in the failed node and the next resource data element is selected at block 287. If the resource master component matches the identifier of the failed node, then the resource was mastered in the failed node and needs to be re-mastered. Accordingly, at block 293, the global resource list is updated by assigning one of the surviving nodes to be the new master for the selected resource. In the particular embodiment of FIG. 7, the master reassignment at block 293 is carried out by assigning a processing node identifier, obtained by indexing an array of node identifiers (i.e., the node list generated in block 285), to the resource master component of the selected resource data element 304. The index variable, i, used to index the node list is incremented in block 295 and rolled to zero if the incremented beyond the index for the last node identifier in the node list (i.e., by applying a modulus function (mod) to obtain the integer remainder of a division of the increment result by the number of surviving nodes). Other techniques for assigning surviving nodes to be the masters of resources formerly mastered in the failed node may be used in alternative embodiments. After the index variable is updated in block 295, the recovery process loops back to block 287 to select the next resource data element. By this operation, the operations in blocks 289-295 are repeated as necessary to re-master each resource that was mastered in the failed node.

FIG. 8B illustrates a lookup table (LUT) 311 that may be used instead of the global resource list of FIG. 8A to identify a resource master and cluster incarnation number for a given resource. In one implementation, the lookup table 311 is an array of D data elements (having indices 0 to D−1 as shown in FIG. 8B), each data element including a resource master component (RsrcMaster) that identifies a resource master, and a resource cluster incarnation number (RsrcCIN) that identifies the cluster incarnation in which the resource master was assigned to the data element. The lookup table 311 is initially populated by assigning identifiers of processing nodes in round-robin fashion to the RsrcMaster components of the lookup table data elements, and by assigning the initial cluster incarnation number to the RsrcCIN components of the look-up table data elements. The following pseudo-code listing illustrates an example of this operation (note that line numbers are provided for convenience of reference and are not intended to imply a particular programming language or that the indicated operations must be performed by a programmed processor):

```
For i = 0 to (D−1)
    LookupTable[i].RsrcMaster = Node [i mod N]
    LookupTable[i].RsrcCIN = CIN
    i = i + 1
End For
```

The dimension of the array, D, may be any number, but is preferably large enough to ensure a relatively even assignment of the N processing nodes to the data elements of the lookup table 311. In one embodiment, for example, D is assigned (or declared to be) the value of the least common multiple of all numbers from 1 to N (i.e., the smallest number that all numbers from 1 to N divide into evenly).

The lookup table 311 may be updated after a processing node failure, for example, by scanning the array to identify data elements for which the RsrcMaster component matches the failed node identifier, assigning identifiers of surviving nodes to the RsrcMaster components of such data elements in round-robin fashion, and updating the RrscCIN components of such data elements with the number for the new cluster incarnation. The following pseudo-code listing illustrates an example of this operation (note that the number of processing nodes, N, and the node list, Node[ ], are first updated to reflect the new cluster incarnation as discussed above in reference to FIG. 7):

```
For i = 0 to (D−1)
    If LookupTable[i].RsrcMaster = Failed Node ID, Then
        LookupTable[i].RsrcMaster = Node [i mod N]
        LookupTable[i].RsrcCIN = CIN
    End If
    i = i + 1
End For
```

Other techniques may be used to update the lookup table 311 in alternative embodiments (e.g., assigning a single processing node identifier to the RsrcMaster component of all data elements previously assigned the identifier of the failed node).

After the lookup table 311 has been initialized or updated, the master for a given node may be looked up by using a hash function to generate a lookup table index based on the resource identifier. For example, in one embodiment, a modulus function is used to generate the index for a given resource ID as follows: LookupTable Index=Resource ID mod D. By generating a lookup table index in this manner, the resource master and cluster incarnation number for a given resource may be obtained without having to traverse a linked list of resource data elements. The resource identifier for a given resource may be determined in a number of ways depending on the nature of the resources and system needs. In one embodiment, for example, the resource identifier is determined based on a logical or physical address of a data resource within a data storage device. In an alternative embodiment, resource identifiers are assigned to resources on an as-needed basis by a resource manager and provided to processes (or other requesting entities) on request. More generally, any techniques for obtaining or determining resource identifiers may be used without departing from the scope of the present invention.

For simplicity of description, embodiments described below refer to obtaining resource master information and cluster incarnation information from a global resource list as described in reference to FIG. 8A. In all such cases, other data structures and techniques may be used to obtain such information including, without limitation, the lookup table technique described in reference to FIG. 8B.

FIGS. 9A and 9B illustrate counterpart operations 320 and 350 performed by local recovery processes within surviving nodes to regenerate lock lists lost in a processing node failure. In the embodiment of FIG. 9A, a recovery process within each surviving node traverses a list of locks held by the surviving node (or held by processes hosted by the surviving node) to identify locks that have been re-mastered in the preceding master reassignment operation. In one embodiment, a linked list referred to herein as a held-locks list (HLL) is maintained within each processing node to identify locks held by (i.e., granted to) that processing node. Referring to FIG. 10, for example, the held-locks list includes a held-locks pointer 370 (Held-Locks) and a number of held-lock data elements $371_1$-$371_R$. Each held-lock data element 371 includes a number of component values including, without limitation, a resource ID component (Resource ID) that identifies a resource locked by the processing node in which the held-locks list is maintained (or locked by a process executed by the processing node), and a lock mode value (Lock Mode) that indicates whether the lock is an exclusive lock or shared lock (various additional access modes or lock types may be specified by the lock mode in alternative embodiments). In the exemplary embodiment of FIG. 10, each held-lock data element 371 additionally includes a pointer component (Next Lock) that points to the next held-lock data element 371 in a linked list. The end of the list may be marked by a tail pointer, a counter that indicates the number of data elements, a null-valued pointer component, or other end-of-list marker. Note that the held-locks list may be implemented in multiple sub-lists as described above in reference to the global resource list.

Returning to operation 320 of FIG. 9A, a held-lock data element is selected from the held-locks list at block 321. Assuming an initial execution of block 321 and assuming that the held-locks list is implemented according to the embodiment of FIG. 10, the selection operation 321 will return a pointer to the first resource data element 371I. The pointer is evaluated at decision block 323 to determine whether the end of the held-lock list has been reached. If not, the cluster incarnation number for the locked resource (i.e., the resource CIN) is retrieved from the global resource list in block 325 (e.g., by traversing the global resource list or sub-list to locate the desired resource data element) and then compared with the cluster identification number for the present cluster incarnation at decision block 327. If the resource CIN matches the present cluster incarnation number, then the resource was re-mastered in the present cluster incarnation and, in block 329, the local recovery process sends a lock recovery message to the new resource master specified in the global resource list, the lock recovery message including the resource ID and lock mode components of the held-lock data element. If the new resource master is the node on which the local recovery process is executing, the lock recovery message may be passed by intra-process or inter-process communication. Otherwise, the lock recovery message may be passed by one or more network links between the sending and receiving nodes. After the lock recovery message has been sent in block 329, the next held-lock data element is obtained in block 321 and the above-described operations repeated.

Returning to decision block 327, if the resource CIN does not match the present CIN, then the resource was not re-mastered in the present cluster incarnation and therefore was mastered in the same node before and after node failure. Accordingly, the message sending operation at block 329 is skipped and execution loops back to block 321 to obtain the next held-lock data element. When the end of the held-locks list is detected in decision block 323, the local recovery process sends a lock-recovery-complete message to the recovery processes in other surviving nodes, if any, to notify those processes that all lock recovery messages have been sent by the local recovery process.

FIG. 9B illustrates the response of a surviving-node recovery process to lock recovery messages sent by recovery processes on other surviving nodes. At block 351, a lock recovery message is received from a processing node that holds a lock to a re-mastered resource. At block 353, the lock is added to the lock list, for example, by appending a lock data value to the lock list described in reference to FIG. 5. Because a lock recovery message is only sent for re-mastered resources for which a surviving node held a lock at the time of node failure detection, the resource identified in a lock recovery message is a partial-delay resource. Accordingly, at block 355, the identified resource is added to a partial-delay list to indicate that the resource is a partial-delay resource. This operation may involve initial inspection of the partial-delay list to determine if the resource has been previously added; adding the resource only if not already present. In one embodiment, the partial-delay list is a linked list having the same structure as the validation queue described in reference to FIG. 6 (though with a different head-of-list pointer). In alternative embodiments, the partial-delay list may be implemented using different data structures.

Still referring to FIG. 9B, if the recovery process has received lock-recovery-complete messages from all surviving nodes (determined in decision block 357), the lock list recovery, and therefore the mastership redistribution operation, is completed. Note that the surviving-node recovery process that carries out the operation 350 may additionally receive lock recovery messages and a lock-recovery-complete message from another recovery process executing on the same processing node (e.g., the other recovery process carrying out the lock holder operations described in FIG. 9A). Alternatively, a single recovery process may be used to carry out the lock holder operations of FIG. 9A (i.e., identifying re-mastered resources and sending lock recovery messages) and the resource master operations of FIG. 9B (regenerating the lock list for re-mastered resources in response to lock recovery messages).

Handling Access Requests During Failure Recovery

Figure 11:
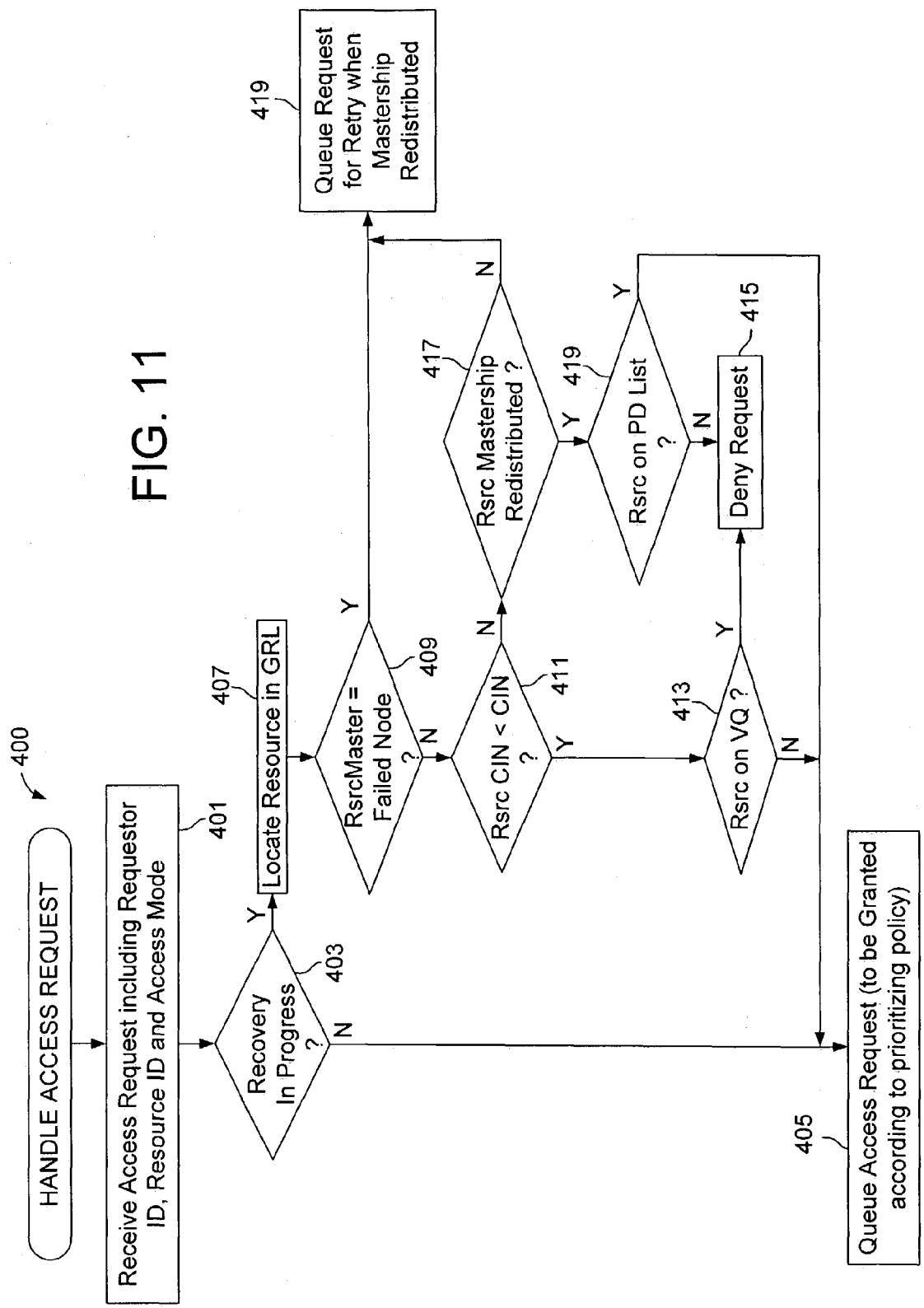
FIG. 11 is an exemplary flow diagram for the operation of a master process during the lock recovery and resource recovery phases of a failure recovery.

FIG. 11 is an exemplary flow diagram 400 for the operation of a master process during the lock recovery and resource recovery phases of a failure recovery. At 401, an access request is received by the master process, the request including a resource ID, requester ID and access mode. The resource ID identifies the resource sought to be accessed, the requester ID identifies the access-requesting processing node (and/or process executing on the processing node) and the access mode indicates whether exclusive or non-exclusive access is requested. At decision block 403, system status is evaluated to determine whether a failure recovery operation is in progress. System status may be determined, for example, by inspecting a flag or other variable that is set during a failure recovery operation and reset during normal operation. If a failure recovery operation is not in progress, then the access request is queued in block 405. If no other requests to access the specified resource are pending (i.e., queued) and no incompatible locks to the resource open, then the requested access is granted by issuance of an appropriate resource lock to the requesting node and/or process. If one or more other requests to access the specified resource are pending, then the new access request is granted according to a predetermined prioritizing policy that may take into consideration, among other things, the identity of the requesting node and/or process, the nature of the access request (e.g., if a number of non-exclusive access requests are pending, all requesters may be granted concurrent access to the shared resource) and other information specified in the access request (e.g., indicia of request priority). Similarly, if the resource is already locked in a mode that is incompatible with the requested access, the new access request is queued pending lock release and is granted according to the aforementioned prioritizing policy.

Returning to decision block 403, if a failure recovery operation is in progress, then the shared resource is located in the global resource list at block 407 so that the identifier of the resource master (RsrcMaster) and cluster incarnation number for the resource (i.e., resource CIN) may be retrieved. In an embodiment in which resources are added to the global resource list when first accessed, the resource may be assigned a master and added to the global resource list if not found in the operation at block 407. At decision block 409, the identifier of the resource master is compared with the failed node identifier to determine if the resource is mastered in the failed node. If so, then the resource is not a zero-delay resource, but may be a partial-delay resource; a status that will not be known until mastership for the resource is redistributed (i.e., until the resource is re-mastered in a surviving node and the lock list for the resource is at least partially recovered). Accordingly, in one embodiment, the access request is queued in a retry queue at block 419 until mastership for the resource is redistributed. In an alternative embodiment, the access request may be denied outright, or denied with notification to retry the request after a predetermined delay or after mastership for the resource is determined to be redistributed.

If the failed node is determined not to be the resource master at decision block 409, then the resource CIN is compared with the present CIN at decision block 411 to determine whether the resource has been re-mastered in the present cluster incarnation. If the resource CIN does not match the present CIN, then the resource was not re-mastered in the present cluster incarnation, and therefore was not mastered in the failed node. If not re-mastered, then the resource is a zero-delay resource if the failed node did not hold an exclusive lock to the resource. Accordingly, if the resource is not on the validation queue (determined by searching the validation queue in decision block 413), then the resource was not exclusively locked by the failed node and therefore constitutes a zero-delay resource. In that case, the access request is queued in block 405. If the resource is on the validation queue, then the resource was exclusively locked by the failed node and the access request is denied. In an alternative embodiment, the access request may be queued on a wait queue that is processed after the failed node transactions recorded in the redo log have been redone (i.e., access delayed until recovery is completed).

Reflecting on the identification of zero-delay resources, it should be noted that access requests received prior to completion of the lock release operation described in reference FIGS. 2 and 4 may inspect an incomplete validation queue. In one embodiment, this circumstance is avoided by prioritizing the lock release operation within each node so that all lock release operations are certain to be completed by the time the validation queue is searched at block 413. In an alternative embodiment, processing of access requests may be held in abeyance for a short time to enable the lock release operations to be completed in the surviving nodes. In another alternative embodiment, the master process may itself complete the lock release operation for the resource in question in response to the access request (e.g., by carrying out the operations described in reference to FIG. 4 for the requested resource). In any case, the lock release operation is relatively fast and introduces negligible delay, if any, to access request processing. Returning to decision block 411, if the resource CIN is equal to the present CIN, then the resource has been re-mastered in the present cluster incarnation and therefore was formerly mastered in the failed node. If mastership redistribution for the resource has been completed (determined in decision block 417), then at decision block 419 the partial-delay list is inspected to determine whether the resource is a partial-delay resource. That is, if the resource is present on the partial-delay list, then the resource was locked by a surviving node at the time the processing node failure was detected, and therefore could not have been exclusively locked by the failed node. Accordingly, if the resource is on the partial-delay list, then the requested access is queued in block 405. If the resource is not on the partial-delay list, then the status of the resource is unknown, and the request is denied at block 415 or delayed (or deferred) pending completion of the failure recovery operation.

As discussed above, shared resources that are not zero-delay resources or partial-delay resources are brought up to date (i.e., recovered) during the resource recovery phase by applying transactions recorded in the redo log for the failed processing node. In one embodiment, the transactions recorded in the redo log are performed on a resource-by-resource basis (or by groups of resources) so that some shared resources are recovered before others. In such an embodiment, resources that have been recovered may be added to a recovered resource list having a structure similar to the validation queue described in reference to FIG. 6. By this operation, when a resource is determined to be on the validation queue (decision block 413 of FIG. 11) or determined not to be on the partial-delay list (decision block 419 of FIG. 11), the recovered resource list may be inspected to determine if the resource has been recovered. If so, then access to the resource is granted as described in reference to block 405 of FIG. 1, even though the overall recovery operation is ongoing. In an alternative embodiment, rather than adding a recovered resource to a recovered resource list, the identifier of the recovered resource may be deleted from the validation queue or added to the partial-delay list, depending on whether the resource has been re-mastered in the present cluster incarnation.

Lock Release in Resource-Transferring Embodiment

In one embodiment, a process referred to herein as a coherency manager operates as an intermediary between requestor processes and a data storage device. For example, after an access request has been granted to a requester process (e.g., shared lock or exclusive lock issued to requestor process), the requestor process issues a resource retrieval request to the coherency manager which, in response, accesses the data storage device to retrieve the requested resource. Similarly, after a requestor process has updated a resource and commits the changes (e.g., records the changes in a redo log), the requestor process issues a resource write request to the coherency manager, which writes the updated data to the physical storage media within the data storage device (e.g., magnetic, optical or semiconductor media).

In one implementation, the coherency manager identifies access requests directed to a shared resource already retrieved for another requestor process, and passes the resource directly from the first requester to the subsequent requester without first writing the resource (which may be modified) to the data storage device. While such resource transfer operations reduce accesses to the data storage device (which tend to be slow and therefore prone to congestion), the transferred resource presents challenges in the face of node failure. For example, in one implementation, a sequence of transfer operations (e.g., resource transferred from one requester process to another) is unwound to the requestor process that made the most recent update to the transferred resource to enable that process to manage the write to data storage device via the cache coherency manager. That is, after a first requester process updates a shared resource, commits the changes (i.e., producing a transaction record in the redo log) and releases its exclusive lock, the updated resource may be transferred to any number of subsequent requestor processes before being returned to the first requester process to be written to the data storage device. Consequently, if the processing node executing the first requestor process fails before the resource transfer to subsequent processes is unwound, the first requester process will be unavailable to complete the write operation. In one implementation, this problem is managed by enabling one of the transferee processes (i.e., processes that received the updated resource in a transfer operation), to write the updated resource to shared storage on behalf of the first requestor process. In some systems, however, it may be desirable to enable the recovery process to redo the changes made by the first requestor process rather than reassign the write responsibility to a transferee process. In such systems, so long as the sequence of transfer operations does not unwind all the way to a dead updating process (i.e., the requestor process that made changes to the shared resource, then became unavailable due to processing node failure) prior to completion of the failure recovery operation, data coherency will be maintained. By contrast, if all the transferee processes release their locks to the resource prior to completion of the failure recovery operation, the resource will be unlocked and yet the resource instance in the shared storage will be stale. Thus, in one embodiment of the invention, requests to release locks are managed during a failure recovery operation by determining whether at least one lock remains open for the resource. If so, then the process requesting lock release cannot be the final process in a transfer-unwind sequence, and therefore performing the requested lock release will not expose a subsequent requester process to obtaining stale data in a data retrieval operation. That is, so long as there is one open lock, a subsequent requester will obtain the resource in a transfer operation rather than from the potentially stale source in the shared storage.

Figure 12:
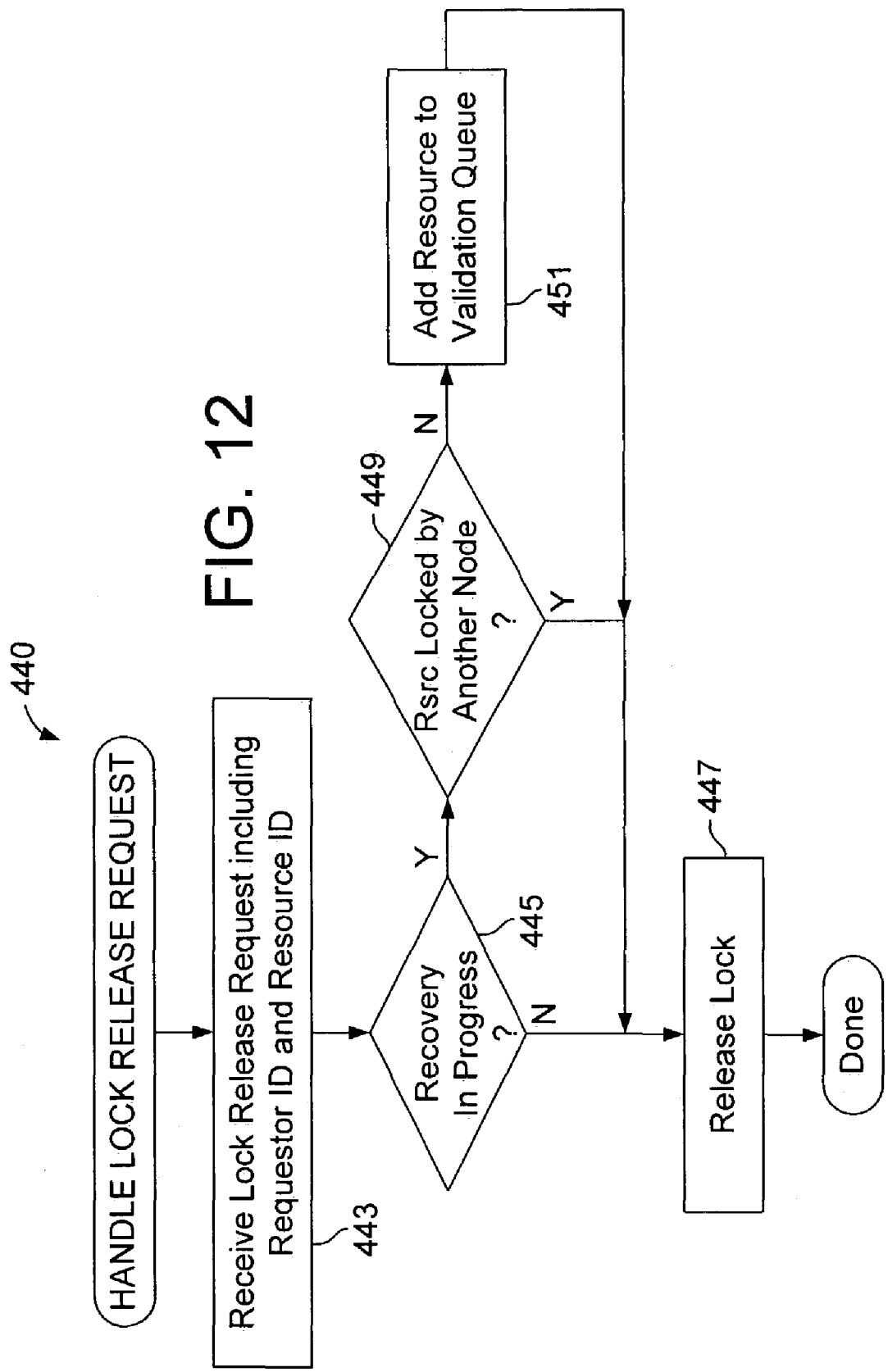
FIG. 12 illustrates the manner in which a master process handles lock release requests according to an embodiment of the invention.

FIG. 12 illustrates the manner in which a master process handles lock release requests according to an embodiment of the invention. At block 443, a lock release request is received, the request including a requester ID that identifies the processing node requesting the lock release (and/or process executing on the processing node) and an identifier of the resource for which a lock release is requested. If a recovery operation is not in progress (determined at decision block 445), then the lock is released at block 447 and the lock release operation is completed. If a recovery operation is in progress, then the lock list (e.g., the linked list described in reference to FIG. 5) is inspected to determine whether another lock is open for the resource. If so, then performing the requested lock release will not leave the resource in an unlocked state (i.e., the state which exposes subsequent access requesters to obtaining a stale version of the resource from shared storage). Accordingly, the lock is released at block 447. By contrast, if no other lock is open for the resource, then releasing the lock will expose subsequent requester processes to obtaining a stale version of the resource. Thus, if no other lock is determined to be open at 449, then the resource is added to the validation queue at 451, thereby preventing access by subsequent requester processes until the recovery is complete. After the resource is added to the validation queue, the lock is released at 447.

Still referring to FIG. 12, it should be noted that, in a system in which updated items are not transferred between processes before being written to a data storage device, it is unnecessary to determine whether a shared resource is locked by another processing node before performing a requested lock release operation. Thus, in an alternative embodiment, requests to release locks are handled summarily by releasing the lock for the identified resource.

Operational Context

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 13:
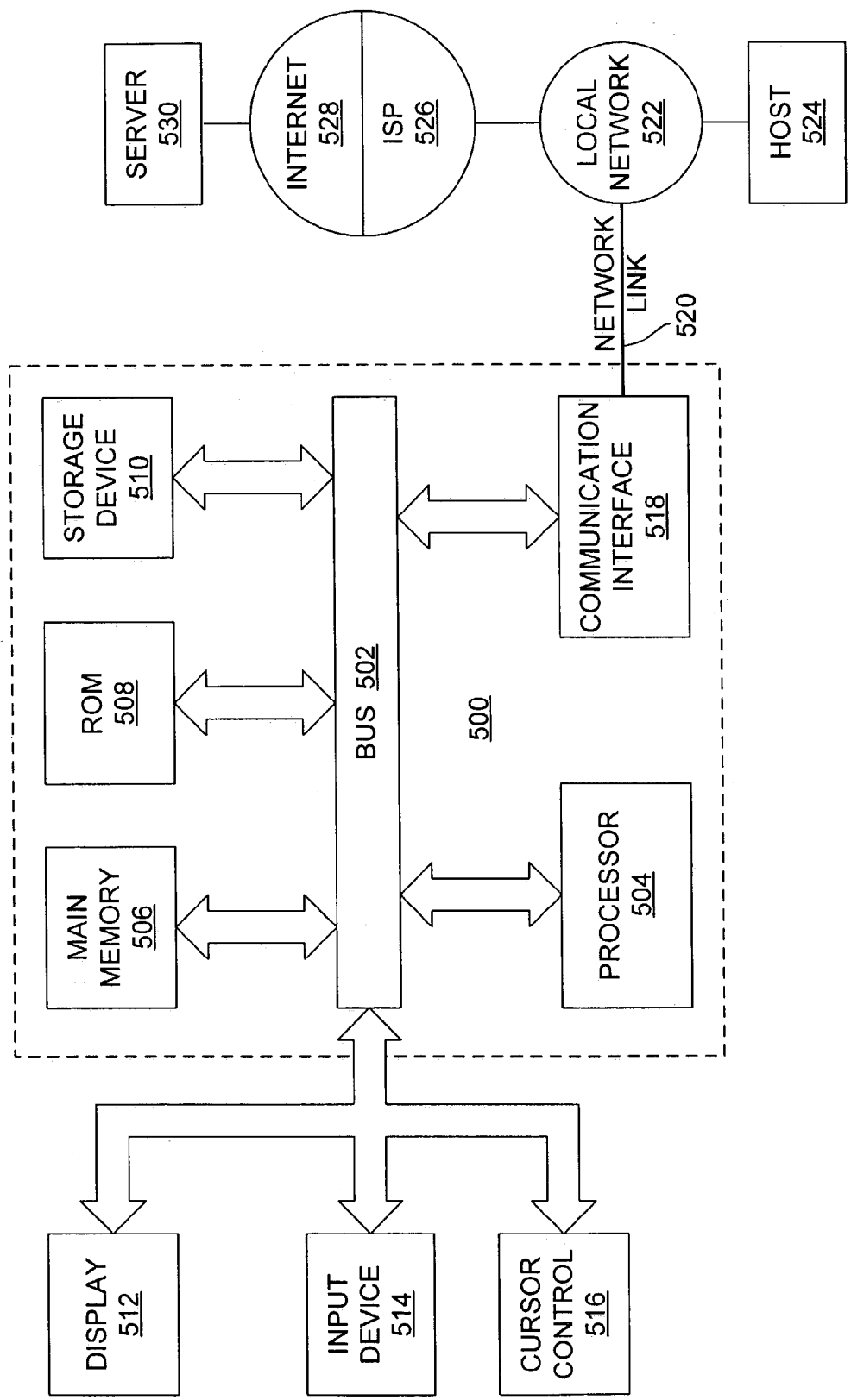
FIG. 13 is a block diagram of a computer system upon which embodiments of the invention may be implemented.

FIG. 13 is a block diagram of a computer system 500 upon which embodiments of the invention may be implemented. Computer system 500 includes a bus 502 or other communication mechanism for communicating information, and a processing entity 504 coupled with bus 502 for processing information. The processing entity 504 may include any number of general purpose and/or special purposes processors co-located within a single computing device or distributed over a network of computing devices. Computer system 500 also includes a main memory 506, such as a random access memory (RAM) or other dynamic storage device, coupled to bus 502 for storing information and instructions to be executed by processing entity 504, including the above described data structures (e.g., lists, tables, variables, etc.) and instructions to be executed by processing entity 504 to carry out the above-described operations. Main memory 506 also may-be used for storing temporary variables or other intermediate information during execution of instructions to be executed by processing entity 504. Computer system 500 further includes a read only memory (ROM) 508 or other static storage device coupled to bus 502 for storing static information and instructions for processing entity 504. A storage device 510, such as a magnetic disk or optical disk, is provided and coupled to bus 502 for storing information and instructions, such as the shared resources described above.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processing entity 504. Another type of user input device is cursor control 516, such as a mouse, a trackball, or cursor direction keys for communicating direction information and command selections to processing entity 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processing entity 504 executing one or more sequences of one or more instructions contained in main memory 506. Such instructions may be read into main memory 506 from another computer-readable medium, such as storage device 510. Execution of the sequences of instructions contained in main memory 506 causes processing entity 504 to perform the operations described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing entity 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processing entity 504 retrieves and executes the instructions. The instructions received by main memory 506 may optionally be stored on storage device 510 either before or after execution by processing entity 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processing entity 504 as it is received, and/or stored in storage device 510, or other non-volatile storage for later execution. In this manner, computer system 500 may obtain application code in the form of a carrier wave.

The section headings in the preceding detailed description are provided for convenience of reference only, and in no way define, limit, construe or describe the scope or extent of such sections. Also, while the invention has been described with reference to specific exemplary embodiments thereof, it will be evident that various modifications and changes may be made thereto without departing from the broader spirit and scope of the invention. The specification and drawings are, accordingly, to be regarded in an illustrative rather than restrictive sense.

What is claimed is:

1. A method of operation within a data processing system that includes a plurality of processing nodes each having access to a set of shared resources, the method comprising:
   detecting a failed node within the plurality of processing nodes;
   granting access, without delay, to the shared resources that were not subject to access control by the failed node and, at the time the failed node was detected, were not subject to exclusive access by the failed node;
   releasing locks to shared resources that were held by the failed node;
   remastering, to non-failed nodes, shared resources that were mastered by the failed node;
   granting access, to shared resources that the failed node controlled and, at the time the failed node was detected, were subject to access by a non-failed node;
   performing redo operations of the failed node; and
   granting access, after performing redo operations, to all shared resources.

2. The method of claim 1 further comprising:
   determining whether the failed node was responsible for controlling access to a first resource; and
   upon determining that the failed node was not responsible for controlling access to the first resource,
      determining whether, at the time the failure was detected, the failed node had exclusive access to the first resource.

3. The method of claim 2 wherein determining whether the failed node was responsible for controlling access to the first resource comprises inspecting a data structure that indicates, for each shared resource within the set of shared resources, which of the plurality of processing nodes is responsible for controlling access to the shared resource.

4. The method of claim 3 wherein determining whether the failed node was responsible for controlling access to the first resource comprises identifying a data element within the data structure that includes a first component that identifies the first resource and a second component that identifies a processing node responsible for controlling access to the first resource.

5. The method of claim 1, wherein remastering further comprises generating a data structure within a first non-failed node that indicates whether a processing node of the plurality of processing nodes, other than the failed node, had access to the shared resources that were mastered by the failed node when the failed node was detected.

6. The method of claim 1, wherein releasing locks further comprises adding an identifier of the shared resources held by the failed node to a validation data structure if the failed node was not responsible for controlling access to the shared resources held by the failed node but had exclusive access to the shared resources held by the failed node when the failure was detected.

7. The method of claim 1, wherein detecting a failed node further comprises determining whether (i) periodic transmissions by the failed node has ceased, (ii) the failed node is non-responsive to communications, or (iii) affirmative failure notification by the failed node.

8. The method of claim 1, wherein remastering further comprises granting access of the shared resources that the failed node controlled and, at the time the failed node was detected, were subject to access by a non-failed node, incrementally as redistribution of access control of shared resources by the failed node to non-failed nodes is performed.

9. The method of claim 1, wherein remastering further comprises granting access of the shared resources that the failed node controlled and, at the time the failed node was detected, were subject to access by a non-failed node, incrementally as redistribution of access control of shared resources by the failed node to non-failed nodes is performed.

10. The method of claim 9, wherein redistribution of access control of shared resources by the failed node to non-failed nodes further comprises master reassignment and lock list recovery, that identifies locks held to re-mastered resources and to notify the new master of the lock.

11. The method of claim 1, wherein releasing locks further comprises each processing node maintaining a lock list comprising lock data values that correspond to resource locks granted by the node but not released.

12. The method of claim 11, wherein lock data values comprise a resource identifier to identify the resource to which the lock corresponds, a lock holder value that identifies the processing node to which the lock has been granted, and a lock mode value that indicates whether the lock is an exclusive lock or shared lock.

13. A computer-readable storage medium carrying one or more sequences of instructions which, when executed by one or more processors, causes the one or more processors to:
    detect a failed node within the plurality of processing nodes;
    grant access, without delay, to the shared resources that were not subject to access control by the failed node and, at the time the failed node was detected, were not subject to exclusive access by the failed node;
    release locks to shared resources that were held by the failed node;
    remaster, to non-failed nodes, shared resources that were mastered by the failed node;
    grant access, to shared resources that the failed node controlled and, at the time the failed node was detected, were subject to access by a non-failed node;
    perform redo operations of the failed node; and
    grant access, after performing redo operations, to all shared resources.

14. The computer-readable storage medium of claim 13, further comprising:
    determining whether the failed node was responsible for controlling access to a first resource; and
    upon determining that the failed node was not responsible for controlling access to the first resource,
    determining whether, at the time the failure was detected, the failed node had exclusive access to the first resource..

15. The computer-readable storage medium of claim 14, wherein determining whether the failed node was responsible for controlling access to the first resource comprises inspecting a data structure that indicates, for each shared resource within the set of shared resources, which of the plurality of processing nodes is responsible for controlling access to the shared resource.

16. The computer-readable storage medium of claim 15, wherein determining whether the failed node was responsible for controlling access to the first resource comprises identifying a data element within the data structure that includes a first component that identifies the first resource and a second component that identifies a processing node responsible for controlling access to the first resource.

17. The computer-readable storage medium of claim 13, wherein remastering further comprises generating a data structure within a first non-failed node that indicates whether a processing node of the plurality of processing nodes, other than the failed node, had access to the shared resources that were mastered by the failed node when the failed node was detected.

18. The computer-readable storage medium of claim 13, wherein releasing locks further comprises adding an identifier of the shared resources held by the failed node to a validation data structure if the failed node was not responsible for controlling access to the shared resources held by the failed node but had exclusive access to the shared resources held by the failed node when the failure was detected.

19. The computer-readable storage medium of claim 13, wherein detecting a failed node further comprises determining whether (i) periodic transmissions by the failed node has ceased, (ii) the failed node is non-responsive to communications, or (iii) affirmative failure notification by the failed node.

20. The computer-readable storage medium of claim 13, further comprising: before completion of the remastering, granting access to at least some of the shared resources that the failed node controlled and, at the time the failed node was detected, were subject to access by a non-failed node.

21. The computer-readable storage medium of claim 13, wherein remastering further comprises granting access of the shared resources that the failed node controlled and, at the time the failed node was detected, were subject to access by a non-failed node, incrementally as redistribution of access control of shared resources by the failed node to non-failed nodes is performed.

22. The computer-readable storage medium of claim 21, wherein redistribution of access control of shared resources by the failed node to non-failed nodes further comprises master reassignment and lock list recovery, that identifies locks held to re-mastered resources and to notify the new master of the lock.

23. The computer-readable storage medium of claim 13, wherein releasing locks further comprises each processing node maintaining a lock list comprising lock data values that correspond to resource locks granted by the node but not released.

24. The computer-readable storage medium of claim 23, wherein lock data values comprise a resource identifier to identify the resource to which the lock corresponds, a lock holder value that identifies the processing node to which the lock has been granted, and a lock mode value that indicates whether the lock is an exclusive lock or shared lock.

25. A system comprising:
- a data storage device having a set of shared resources stored therein; and
- a plurality of processing nodes each having a processing entity and a memory coupled to the processing entity, the memory having program code stored therein which, when executed by said processing entity, causes said processing entity to:
  - detect a failed node within the plurality of processing nodes;
  - grant access, without delay, to the shared resources that were not subject to access control by the failed node and, at the time the failed node was detected, were not subject to exclusive access by the failed node;
  - release locks to shared resources that were held by the failed node;
  - remaster, to non-failed nodes, shared resources that were mastered by the failed node;
  - grant access, to shared resources that the failed node controlled and, at the time the failed node was detected, were subject to access by a non-failed node;
  - perform redo operations of the failed node; and
  - grant access, after performing redo operations, to all shared resources.

* * * * *

UNITED STATES PATENT AND TRADEMARK OFFICE
CERTIFICATE OF CORRECTION

PATENT NO. : 7,284,151 B2  Page 1 of 1
APPLICATION NO. : 10/624242
DATED : October 16, 2007
INVENTOR(S) : Chandrasekaran It is certified that error appears in the above-identified patent and that said Letters Patent is hereby corrected as shown below:

In column 1, line 49, after "arrow" delete "l11" and insert -- 111 --, therefor.

In column 16, line 33, delete "FIG. 1" and insert -- FIG. 11 --, therefor.

In column 18, line 36, delete "may-be" and insert -- may be --, therefor.

In column 21, lines 22-28, in Claim 8, delete "The method of claim 2, wherein remastering further comprises granting access of the shared resources that the failed node controlled and, at the time the failed node was detected, were subject to access by a non-failed node, incrementally as redistribution of access control of shared resources by the failed node to non-failed nodes is performed." and insert -- The method of claim 1, further comprising: before completion of the remastering, granting access to at least some of the shared resources that the failed node controlled and, at the time the failed node was detected, were subject to access by a non-failed node. --, therefor.

In column 22, line 13, in Claim 14, delete "resource.." and insert -- resource. --, therefor.

Signed and Sealed this

Twenty-fourth Day of June, 2008

JON W. DUDAS
*Director of the United States Patent and Trademark Office*